Z. P. CANDEE.
FRICTION BRAKE.
APPLICATION FILED MAY 14, 1909.
1,072,424.
Patented Sept. 9, 1913.
2 SHEETS—SHEET 2.
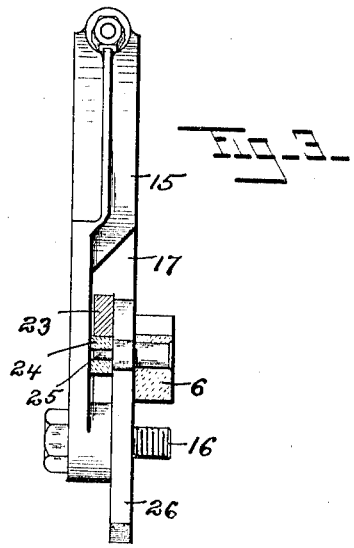
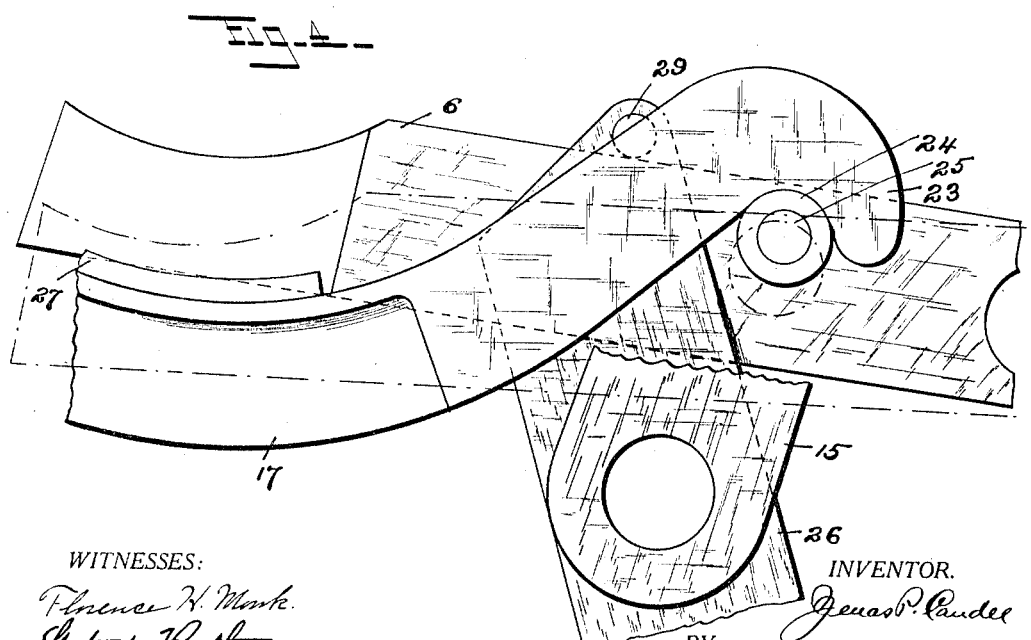
WITNESSES:
Florence H. Monk.
Gertrude Brithauer
INVENTOR.
Zenas P. Candee
BY
George E. Hall
ATTORNEY.

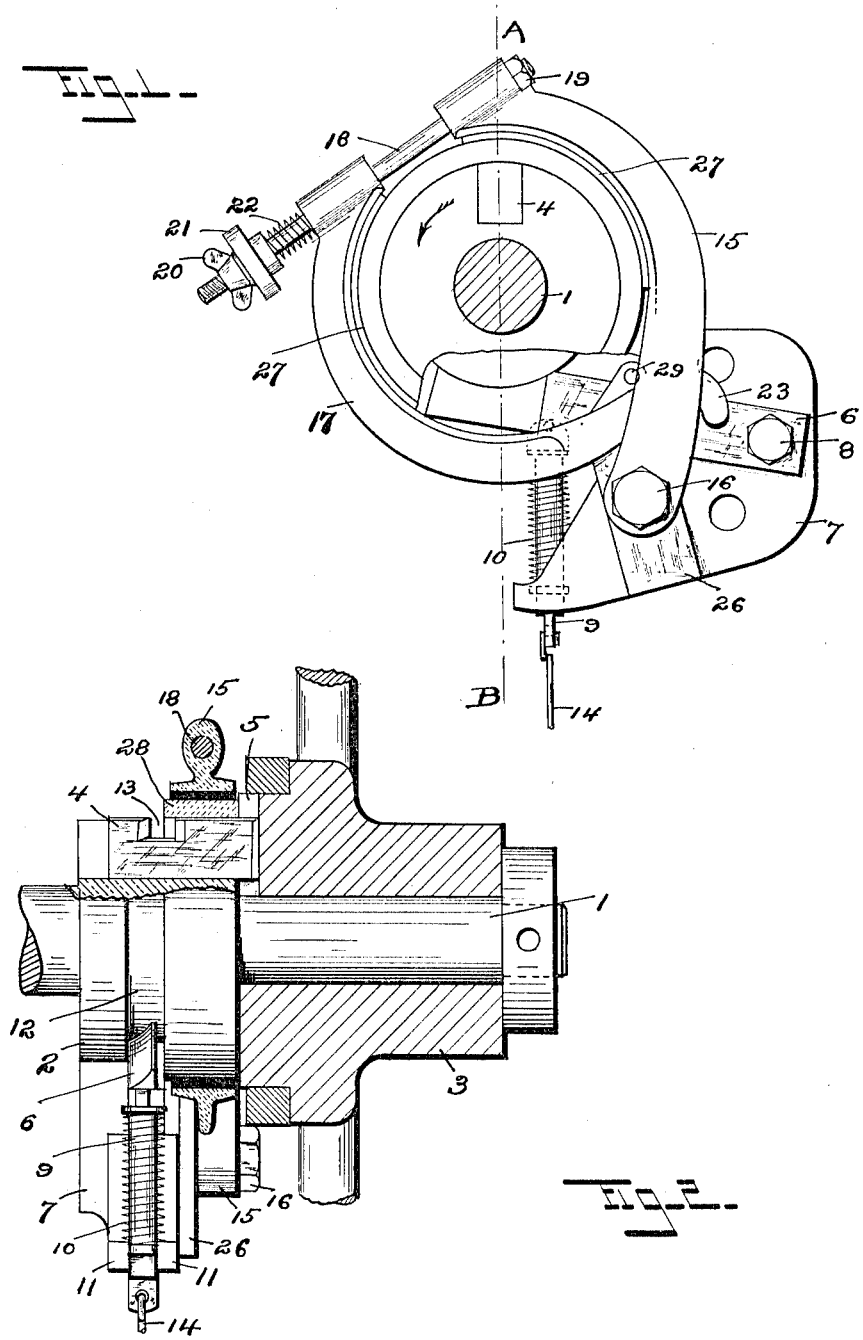

UNITED STATES PATENT OFFICE.

ZENAS P. CANDEE, OF WATERBURY, CONNECTICUT, ASSIGNOR TO THE WATERBURY FARREL FOUNDRY AND MACHINE COMPANY, OF WATERBURY, CONNECTICUT, A CORPORATION OF CONNECTICUT.

FRICTION-BRAKE.

1,072,424.  Specification of Letters Patent.  Patented Sept. 9, 1913.

Application filed May 14, 1909. Serial No. 495,947.

*To all whom it may concern:*

Be it known that I, ZENAS P. CANDEE, a citizen of the United States, residing at Waterbury, in the county of New Haven and State of Connecticut, have invented certain new and useful Improvements in Friction-Brakes, of which the following is a specification, reference being had therein to the accompanying drawings.

My invention relates to new and useful improvements in friction brakes for presses and other like machinery, and has for its object, among other things, to provide a friction mechanism that will lie loosely upon the shaft during the rotation thereof without friction and will, when in operation, grip the shaft with sufficient friction to make it an effectual brake, and to accomplish these results with practically no additional parts over those now used on friction mechanism of this character.

To these, and other ends, my invention consists in the friction brake having certain details of construction and combinations of parts, as will be hereinafter described and more particularly pointed out in the claims.

Referring to the drawings, in which like numerals of reference designate like parts in the several figures: Figure 1 is an elevation of my improved device with a sectional end view of the shaft with which it is connected; Fig. 2 is a sectional view thereof upon line A—B of Fig. 1; Fig. 3 is an end elevation thereof; and Fig. 4 is an enlarged elevation of the clutch lever and the adjacent parts.

In the drawings the numeral 1 designates the rotary shaft of a press, or other similar machine, having a friction head 2 thereon, a key 4 axially movable therein, and upon which is rotatable a driving wheel 3. The key 4 in one of its positions has engagement with the groove 5 in the hub of said wheel, as is common in the art, and is moved out of said engagement by a clutch lever 6 that is pivotally mounted on a fixed plate 7 by the bolt 8, said clutch lever having the rod 9 connected therewith, which is surrounded by a spring 10 that lies between the head of said rod and arms 11 upon said fixed plate, and the tension of which is exerted to hold said lever against the stop pin 29 in the plate 26 with its head in the groove 12 and in the path of a notch 13 in the key 4. The lever 6 is swung upon its pivot bolt 8 and away from the head 2 through a treadle connected by a rod 14 with the spring rod 9. All of the parts above described are constructed and operated in a manner already well known and therefore do not constitute any part of this invention.

The friction mechanism comprises the arm 15 which is pivotally connected to the plate 7 by a bolt 16, the arm 17 which is connected at one end to the arm 15 by the bolt 18 having a nut 19 upon one end and a thumb nut 20 on the other end between which and one of the arms is the friction nut 21 and spring 22. The other end of said friction arm 17 is curved to form the hook 23 which is in the path of movement of a roll 24 rotatable upon a stud 25 fixed in the clutch lever 6. The roll is not absolutely essential to the operation of my device and therefore I do not limit myself to its use.

The inner faces of the arms 15 and 17 are provided with leather pads 27 which are in immediate contact with the friction ring 28 fixed on the head 2. Ordinarily the arms 15 and 17 are secured together without the use of the spring 22 which is only used where it is desired to have a slight constant friction upon the shaft. During the rotation of the shaft the clutch lever 6 occupies its down position, shown by broken lines in Fig. 4, out of the line of movement of the key 4, and the shaft is rotated through the engagement of said key with the driving wheel 3, at which time the arms 15 and 17 simply lie upon the shaft without exerting any friction thereon except such as is created by the weight of the arm 15. The friction brake is operated by taking the foot off the treadle, which permits the spring 10 to throw the clutch lever 6 upwardly against the stop pin 29 with the outer end thereof in the path of the notch 13 in the key 4, which is withdrawn from the hub of the driving wheel 3, thus breaking the connection between said shaft and wheel. During this movement of the lever 6 the roll 24 engages the hook 23 upon the end of the arm 17, which draws the arms 15 and 17 together and exerting a friction grip on the ring 28. The grip or friction on the shaft can be varied indefinitely by substitution of springs of the desired tension, and as it operates only when the key is withdrawn from the driving wheel, the wear upon the parts is reduced to the minimum.

There are minor changes and alterations that can be made within my invention, and I would therefore have it understood that I do not limit myself to the exact construction herein shown and described, but claim all that falls fairly within the spirit and scope of my invention.

Having described my invention, what I claim as new and desire to secure by Letters Patent, is:—

1. The combination, with a rotary body, and a movable key adapted to engage the same; of a friction arm adapted to engage said body for terminating its rotation, said arm being provided with a hooked end; a movable clutch lever having an end thereof arranged in the path of said key for withdrawing the latter from engagement with said body; means provided upon said lever and adapted to engage said hook to force said arm against said body; and means for moving said lever in one direction to simultaneously disengage said key from and engage said arm with said body.

2. The combination, with a rotary body; and a movable key arranged to engage the same; of a pair of curved friction arms disposed upon opposite sides of said body for engagement therewith, one of said arms being pivoted at one end and having its opposite end connected to the adjacent end of the other arm; a movable clutch lever having a part disposed in the path of said key for disengaging the latter from said body when said lever is moved in one direction; a member carried by the lever and arranged to engage the opposite end of the second-named arm when said lever is moved in such direction for forcing both arms against said body simultaneously with the disengagement of said key; and means for operating said lever.

3. The combination, with a rotary body; and a movable key arranged to engage the same; of a pair of curved friction arms disposed upon opposite sides of said body for engagement therewith, one of said arms being pivoted at one end and having its opposite end connected to the adjacent end of the other arm, the opposite end of said other arm being formed with a hook; a movable clutch lever having a part disposed in the path of said key for disengaging the latter from said body when said lever is moved in one direction; a member fixed to the lever and arranged to directly engage said hook when said lever is moved in such direction for forcing both arms against said body simultaneously with the disengagement of said key; and means for operating said lever.

4. The combination with a rotary body, a movable key arranged to engage the same, and a stationary plate located adjacent the same; of a curved friction arm pivoted at one end to said plate; a second curved friction arm disposed upon the opposite side of said body from the first-named arm and having one end disposed adjacent the pivoted end of the latter and formed with a hook and its opposite end connected to that of said first-named arm; a clutch lever pivoted to said plate and having a part disposed in the path of said key for disengaging the latter from said body when said lever is swung in one direction; a member fixed to the lever and arranged to directly engage said hook when said lever is moved in such direction for forcing both arms against said body simultaneously with the disengagement of said key; and means for operating said lever.

In testimony whereof I affix my signature in presence of two witnesses.

ZENAS P. CANDEE.

Witnesses:
 GEORGE E. HALL,
 J. M. GALLOND.

---

Copies of this patent may be obtained for five cents each, by addressing the "Commissioner of Patents, Washington, D. C."